Patented June 3, 1947

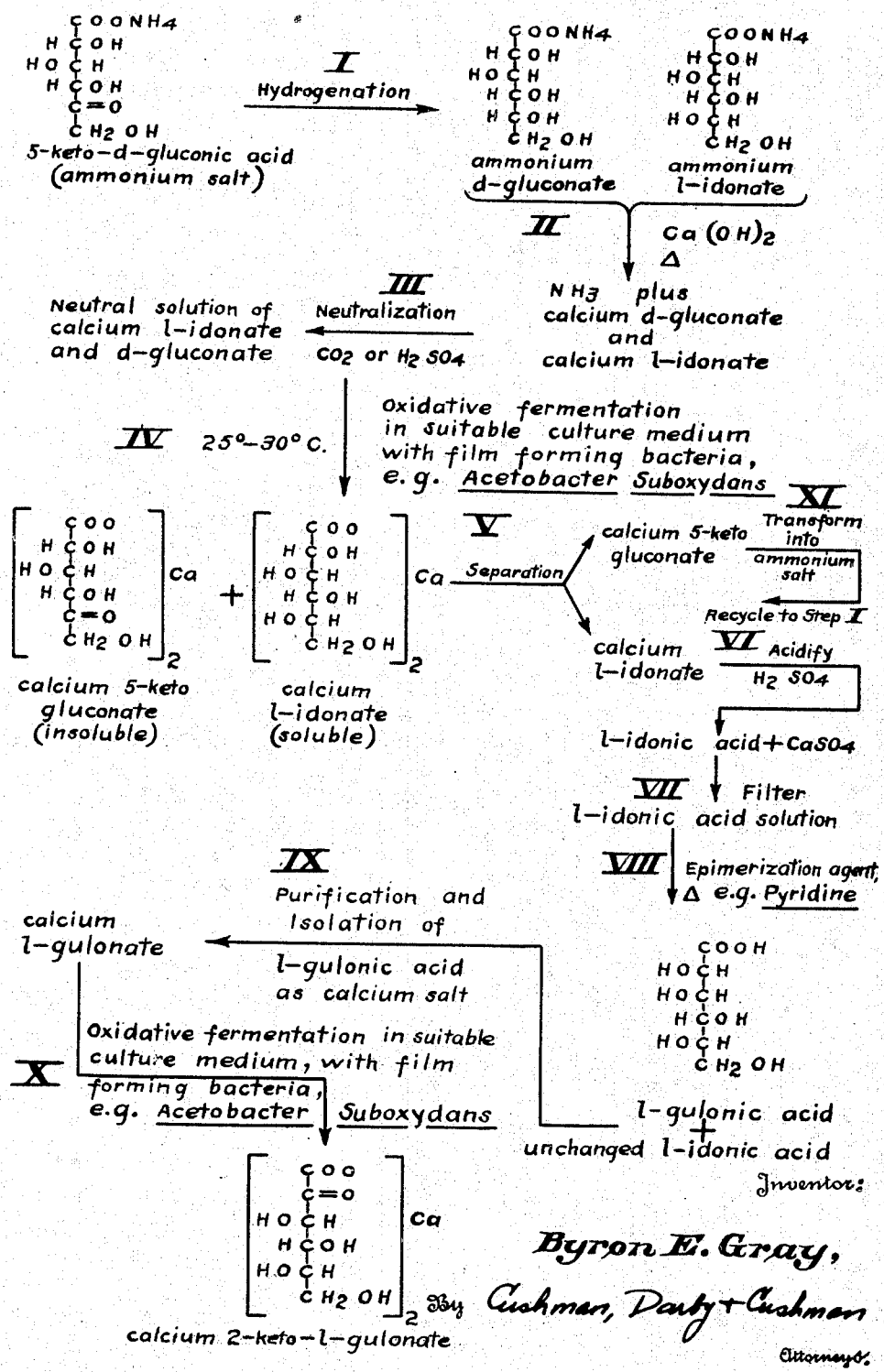

2,421,612

UNITED STATES PATENT OFFICE 2,421,612

PREPARATION OF 2-KETO GULONIC ACID AND ITS SALTS

Byron E. Gray, Alton, Ill.

Application May 4, 1945, Serial No. 591,879

4 Claims. (Cl. 195—47)

This invention relates to a new and improved method for the manufacture of 2-keto-gulonic acid, also called 1-xylo-2-ketohexonic acid or 2-keto-l-idonic acid.

It is well known in the art that 2-keto-l-gulonic acid, or its esters, serves as a final intermediate for the manufacture of the physiologically important l-ascorbic acid, better known as synthetic vitamin C.

The established conventional process for producing 2-keto-l-gulonic acid is rather complicated, consisting of reduction of d-glucose to sorbitol, bacterial oxidation of sorbitol to sorbose, formation of di-acetone sorbose, oxidation of di-acetone sorbose to di-acetone 2-keto-l-gulonic acid, and hydrolysis of di-acetone 2-keto-l-gulonic acid, to give 2-keto-l-gulonic acid. (Reichstein and Gruessner, Helv. Chim. Acta, 17:311, 1934.)

A principal object of this invention is the provision of a new method for the preparation of 2-keto-l-gulonic acid or its salts. A further object is the provision of a new procedure for the production of 2-keto-l-gulonic acid or its salts from l-gulonic acid and its salts. Still further objects include the provision of a new procedure for the production of vitamin C intermediate from d-glucose and, in turn, 5-keto-d-gluconic acid with a high degree of efficiency and resulting good yields and the provision of a new method for the production of l-idonic acid from 5-keto-d-gluconic acid by hydrogenation.

These objects are accomplished according to the process of my invention by hydrogenating the ammonium salt of 5-keto gluconic acid to obtain a mixture of ammonium d-gluconate and ammonium l-idonate, converting the said mixture into the corresponding calcium salts of l-idonic and d-gluconic acid, eliminating the calcium salt of d-gluconic acid from the mixture of oxidative fermentation as the insoluble calcium salt of 5-keto gluconic acid, epimerizing the resultant remaining l-idonic acid or its salts to give l-gulonic acid, its salts or lactone, and converting the said l-gulonic acid or its salts to 2-keto-l-gulonic acid or its salts by oxidative fermentation.

DISCUSSION OF THE PROCESS

Reference is made to the attached drawing which constitutes an abbrevated flow-sheet of my process, in order to aid in a clearer understanding of this invention.

(a) *Preparation of l-idonic acid and/or its salts*

It has been found that 5-keto gluconic acid may be easily produced from the readily available d-glucose (corn sugar) either by chemical oxidation (Kiliani, Berichte, 55B:2817, 1922) or by oxidative fermentation. (Boutroux, Compt. rend., 102:924 and 111:185; Stubbs et al., Ind. and Eng. Chem., 32:1626, 1940.) The 5-keto gluconic acid is usually isolated as the almost insoluble calcium salt, containing 2½ molecules of water of crystallization.

It is known that the calcium salt of d-gluconic acid may be converted by oxidative fermentation to the almost insoluble calcium salt of 5-keto gluconic acid. (Stubbs et al., Ind. and Eng. Chem., 32:1626, 1940.) Said oxidative fermentation does not affect the salts of l-idonic acid.

It is also known that the calcium salt of 5-keto gluconic acid may be hydrogenated in the presence of a suitable catalyst to give a mixture of calcium l-idonate and calcium d-gluconate. (Pasternack and Brown, U. S. Patent, 2,168,878.)

I have now found that the ammonium (as well as the alkali metal salts, e. g., potassium and sodium) salt of said 5-keto gluconic acid is capable of hydrogenation in substantially the same manner as the calcium salt, but, hydrogenation is easier and lower pressures or temperatures may be used if desired with these more soluble salts.

The mixture of ammonium salts of l-idonic acid and d-gluconic acid resulting from said hydrogenation of the ammonium salt of 5-keto gluconic acid (step I) is treated with lime (calcium hydroxide) and heated, which drives the ammonia off and gives a mixture of the calcium salts of l-idonic and d-gluconic acid (step II). Excess calcium hydroxide in said mixture is suitably neutralized (step III), for example with carbon dioxide or sulfuric acid, and the resultant calcium carbonate or sulfate filtered off, leaving a neutral solution of calcium l-idonate and d-gluconate.

To this solution is now added d-glucose (corn sugar), suitable nutrients, and a buffering agent, such as calcium carbonate, and the resultant culture liquid is fermented (step IV) with bacteria of the Acetobacter group (or other film forming bacteria). Such fermentation may be done either by the shallow pan surface growth method, without aeration, or by submerged growth, maintaining the culture liquid in a high state of agitation, with simultaneous introduction of large quantities of air, either under atmospheric or superatmospheric pressure. Yields and rate of oxidative fermentation are increased by the latter method. The culture medium may be kept at various temperatures, but the best range is 25–30° C.

When oxidative fermentation is complete, the calcium d-gluconate, together with most of the d-glucose not consumed by the bacteria, will be found to have been converted to calcium 5-keto gluconate. Said calcium 5-keto gluconate, being almost insoluble, may be filtered off, leaving the unchanged calcium l-idonate in solution (step V).

The calcium 5-keto gluconate thus obtained as a by-product may be used as a raw material for the ammonium 5-keto gluconate in the previously described hydrogenation (step XI).

(b) *Preparation of l-gulonic acid and/or its salts or lactone*

It has been found that by heating a solution of the aldonic sugar acids, their salts or lactones, in the presence of bases, such as pyridine, quinoline, ammonia, or barium or calcium hydroxide, an epimerization results. (Fischer and Stahel, Berichte, 24:529, 1891; Bonnet and Upson, J. Am. Chem. Soc. 55:1245, 1933.)

The calcium l-idonate solution obtained as previously described is treated with sulfuric acid until the calcium ion is set free (step VI), and the resultant calcium sulfate is then filtered off (step VII).

To the filtrate, consisting of an aqueous solution of l-idonic acid, is added pyridine, and the solution is heated at 140° C. under pressure for three hours, or boiled under reflux for 115 hours (step VIII). Calcium hydroxide is then added, and the pyridine distilled off and recovered. The mixture is then filtered, eliminating excess calcium hydroxide, and evaporated to dryness.

To the dry residue of crude calcium l-gulonate and unchanged l-idonate is added hydrochloric acid and benzaldehyde, with vigorous agitation. The insoluble di-benzal derivative of l-idonic acid soon separates and, after dilution with water, is filtered off. The di-benzal l-idonic acid is easily hydrolyzed to benzaldehyde and l-idonic acid thus obtained is then recycled for epimerization with the subsequent batch as described above.

The filtrate from the di-benzal l-idonid acid contains l-gulonic acid. It is carefully neutralized with calcium carbonate, and an equal volume of alcohol is added. Calcium l-guonate separates and is filtered off (step IX). It may be purified by recrystallization from water, or by converting to the lactone thru treatment with sulfuric acid, to remove the calcium ion, filtering off the resultant calcium sulfate, and concentrating to a syrup, whereupon the lactone separates on standing. The lactone is easily converted into calcium l-gulonate by heating with calcium carbonate.

(c) *Preparation of 2-keto-l-gulonic acid (l-xylo-2-keto-hexonic acid and/or its salts*

It has been found that certain bacteria of the Acetobacter series (as well as other species of film forming bacteria) have the power to oxidize polyhydric alcohols possessing the proper configuration to corresponding keto alcohols. (Hann et al., J. Am. Chem. Soc, 60:1201, 1938; Bertrand, Ann. chim. phys., 3:181, 1904.) The factors pertaining to such oxidation are summed up by Fulmer et al., Iowa State College Journal of Science, 15:30, 1940.

I have now found that this type of bacteria also has the power to oxidize gulonic acid, to the corresponding 2-keto acid. Such bacteria have the power to produce enzymes capable of oxidizing the gulonic acid, but cannot well assimilate the acids. However, if a salt (for example, calcium) of l-gulonic acid is oxidatively fermented by a member of the Acetobacter or other film forming series of bacteria, in the presence of a small amount of suitable substrate such as glycerol, corn sugar, mannitol, sorbitol, or maltose, there is formed the corresponding salt of 2-keto-l-gulonic acid (step X). The substrate permits the bacteria to grow and produce enzymes which then are capable of oxidizing the l-gulonic acid to the corresponding 2-keto acid.

Such oxidative fermentation of the above-described culture solution may be carried out by the surface growth shallow pan method, without aeration, or by submerged growth, maintaining the solution in a high state of agitation, with simultaneous introduction of large quantities of air, either under atmospheric or super-atmospheric pressure. Yields and rate of oxidative fermentation are increased by the latter method. The culture medium may be kept at various temperatures, but the optimum range is 25–30° C.

When oxidative action is complete, the culture solution is clarified, filtered, concentrated under reduced pressure and cooled, whereupon the calcium salt of l-xylo 2-keto hexonic acid crystallizes and is filtered off and dried. Alternately, the salt may be precipitated from the cool concentrated solution with alcohol. The calcium l-xylo 2-keto hexonate is easily changed into the free acid by treatment with sulfuric acid, or may be converted directly into an ester by treatment with acid in anhydrous alcohol solution.

The operation of my process may be fully comprehended from the following illustrative example in which all parts are by weight unless otherwise specified.

A suspension of 172 parts of calcium 5-keto gluconate, $2\frac{1}{2}H_2O$ in 2000 parts of distilled water is prepared by agitation of the salt in the required amount of water. The suspension is cooled to 20° C. and sulfuric acid carefully added with agitation until all the 5-keto gluconic acid is set free. Temperature is kept at 20° C. or below during addition of acid.

The mixture is next carefully neutralized to litmus with ammonia, gaseous or aqua. It is then heated to 50° C. and filtered. To the filtered solution of ammonium 5-keto gluconate are added 25 parts of Raney nickel catalyst and the mixture is placed in an agitated autoclave and heated at 60° C. under a hydrogen pressure of 100 atmospheres. Progress of hydrogenation may be followed by testing with Fehling's solution. Ordinarily, the hydrogenation will take about four or six hours.

When hydrogenation is complete, the pressure is released and the catalyst is filtered off. Catalyst may be reused if the hydrogen used was pure. If not, it may be regenerated. The filtrate is treated with 75 parts of hydrated lime and heated until substantially all the ammonia has been driven off. The mixture is then cooled and neutralized with carbon dioxide, a little activated carbon is added, and the solution is filtered and concentrated to 1000 parts.

To the filtered and clarified solution are added 75 parts glucose, 6 parts corn steeping liquor, and 0.3 part octadecyl alcohol, and the pH is adjusted to 6.0 plus or minus 0.1.

The solution is now placed in a suitable vessel equipped with a distributor inlet for sterile air consisting of an alundum ball. The vessel also has an air outlet, and a sample withdrawal outlet. The solution is sterilized by heating at 15 lbs. steam pressure for 15 minutes, cooled, and 17 parts calcium carbonate (sterilized separately) are added. The culture solution is then inoculated with 50 parts of a 48 hour culture of *Acetobacter suboxydans* grown on a 5 per cent sorbitol-0.5 per cent yeast extract liquid tube culture, and the inoculated medium is agitated vigorously with sterile air for a period of 8 days.

After the fermentation is complete, the precipitated calcium 5-keto gluconate is filtered off. About 175 parts are obtained, which is used as raw material for the subsequent batch.

The filtrate contains calcium l-idonate together with a trace of calcium 5-keto gluconate. To it is added sulfuric acid until the calcium ion is set free and converted to calcium sulfate. The solution is then filtered.

The filtrate contains l-idonic acid. It is concentrated to a volume of 200–250 parts, placed in a strong reaction vessel, and 40 parts of pyridine are added. The closure is then put tightly in place and the mixture heated on the oilbath at 140° C. for three hours.

At the end of three hours, the solution is diluted with 100 parts water, 20 parts of calcium hydroxide are added, and the mixture is heated until all the pyridine has been distilled off and recovered. The mixture is next filtered to remove excess calcium hydroxide, and evaporated to dryness.

To the residue from the evaporation are next added 40 parts benzaldehyde and 80 parts of hydrochloric acid (sp. gr. 1.19) with vigorous agitation. Presently, a precipitate of di-benzal l-idonic acid separates and after dilution with a little water is filtered off. About 60 parts are obtained.

The filtrate contains l-gulonic acid. Calcium carbonate is now carefully added until the mixture is neutral to litmus. To the mixture is now added an equal volume of alcohol. The calcium l-gulonate precipitates and is filtered off. It is purified by dissolving in the minimum amount of hot water, adding a little carbon and filtering, cooling, and reprecipitating with alcohol. Yield is 15 parts of the calcium salt of l-gulonic acid.

The di-benzal l-idonic acid is reworked by suspending it in ten times its weight of a 50% alcohol-50% N/10 sulfuric acid mixture and heating under reflux for one hour. The mixture is then neutralized to litmus with calcium carbonate and the separated mixture of calcium l-idonate and calcium sulfate is filtered off. The mixture may be added to the subsequent batch of calcium l-idonate before epimerization.

120 parts of purified calcium l-gulonate, obtained as previously described, are dissolved in water and the solution is made up to 1000 parts. To this solution are now added 5 parts corn steeping liquor, 0.3 part octadecyl alcohol, 5 parts maltose or sorbitol, and the pH is adjusted to 6.0 plus or minus 0.1.

The solution is now charged into a fermentation vessel and sterilized at 15 lbs. steam pressure for 15 minutes. It is then cooled to 25° C. after which it is inoculated with 50 parts of the *Acetobacter suboxydans* culture indicated above. The inoculated medium is aerated vigorously, using a porous alundum ball, for 8 days. Course of fermentation may be followed by testing with Fehling's solution.

At the end of the fermentation, a little activated carbon is added to the solution, and is filtered. It is then concentrated under reduced pressure to a syrup (100–200 parts), cooled, and two volumes of ethyl alcohol are added. The calcium 2-keto-l-gulonate separates and is filtered off and dried. Yield is 90 parts.

Having thus described my invention, what I claim for Letters Patent is:

I claim:

1. The process for the production of a material from the group consisting of 2-keto gulonic acid and its calcium salt, which comprises oxidative fermentation of a substance from the group consisting of gulonic acid and its calcium salt in the presence of the bacteria *Acetobacter suboxydans*.

2. The process of claim 1, wherein the fermentation is conducted by cultivating the bacteria in a submerged state, with aeration.

3. The process of claim 1, wherein the fermentation is conducted by cultivating the bacteria in surface growth.

4. The process for the production of a material from the group consisting of 2-keto gulonic acid and its calcium salt, which comprises inoculating an aqueous solution of the calcium salt of gulonic acid with the bacteria *Acetobacter suboxydans* and oxidatively fermenting said inoculated solution.

BYRON E. GRAY.

REFERENCES CITED

The following references are of record in the file of this patent:

UNITED STATES PATENTS

| Number | Name | Date |
|---|---|---|
| 2,168,878 | Pasternack and Brown | Aug. 8, 1939 |
| 2,318,641 | Stubbs et al. | May 11, 1943 |

OTHER REFERENCES

Fischer & Stahel, Berichte 24, 529 (1891).
Stubbs et al., Ind. Eng. Chem. 32, 1626 (1940).